US011995106B2

United States Patent
Heine et al.

(10) Patent No.: US 11,995,106 B2
(45) Date of Patent: May 28, 2024

(54) CROWD ASSISTED QUERY SYSTEM

(71) Applicant: eBay Inc., San Jose, CA (US)

(72) Inventors: Luke Richard-Ivar Heine, Cloquet, MN (US); Mohammadhadi Kiapour, San Francisco, CA (US)

(73) Assignee: EBAY INC., San Jose, CA (US)

( * ) Notice: Subject to any disclaimer, the term of this patent is extended or adjusted under 35 U.S.C. 154(b) by 0 days.

(21) Appl. No.: 17/836,796

(22) Filed: Jun. 9, 2022

(65) Prior Publication Data

US 2022/0300536 A1 Sep. 22, 2022

Related U.S. Application Data

(63) Continuation of application No. 16/578,774, filed on Sep. 23, 2019, now Pat. No. 11,386,125, which is a
(Continued)

(51) Int. Cl.
*G06F 16/28* (2019.01)
*G06F 16/242* (2019.01)
(Continued)

(52) U.S. Cl.
CPC ........ *G06F 16/285* (2019.01); *G06F 16/2423* (2019.01); *G06F 16/903* (2019.01);
(Continued)

(58) Field of Classification Search
CPC .. G06F 16/285; G06F 16/2423; G06F 16/903; G06F 16/9032; G06N 3/045; G06N 20/00
See application file for complete search history.

(56) References Cited

U.S. PATENT DOCUMENTS 5,493,677 A 2/1996 Balogh et al.
6,606,623 B1 8/2003 Hsieh et al.
(Continued)

FOREIGN PATENT DOCUMENTS

CN 102124439 A 7/2011
CN 102667768 A 9/2012
(Continued)

OTHER PUBLICATIONS

DiPalantino, Dominic, and Milan Vojnovic. "Crowdsourcing and all-pay auctions." Proceedings of the 10th ACM conference on Electronic commerce. 2009. (Year: 2009).*
(Continued)

*Primary Examiner* — Jay A Morrison
(74) *Attorney, Agent, or Firm* — SCHWEGMAN LUNDBERG & WOESSNER, P.A.

(57) ABSTRACT

Aspects of the present disclosure relate to a network-based crowd assisted query system that includes a client device in communication with an application server executing the crowd assisted query system over a network. For example, the crowd assisted query system may be or include a group of one or more server machines. Users of the crowd assisted query system are presented with a graphical user interface (GUI) configured to receive queries that include data objects, wherein the data objects include representations of unidentified items of interest to the user. The data objects may include media content, such as graphical images as well as audio data, and in some example embodiments may further include text data describing the unidentified items.

18 Claims, 11 Drawing Sheets

Related U.S. Application Data continuation of application No. 15/345,627, filed on Nov. 8, 2016, now Pat. No. 10,452,688.

(51) Int. Cl.
  *G06F 16/903* (2019.01)
  *G06F 16/9032* (2019.01)
  *G06N 3/045* (2023.01)
  *G06N 20/00* (2019.01)

(52) U.S. Cl.
  CPC ......... *G06F 16/9032* (2019.01); *G06N 3/045* (2023.01); *G06N 20/00* (2019.01)

(56) References Cited

U.S. PATENT DOCUMENTS

| | | | |
|---|---|---|---|
| 6,970,860 | B1 | 11/2005 | Liu et al. |
| 7,603,367 | B1 | 10/2009 | Kanter et al. |
| 8,065,199 | B2 | 11/2011 | Dumon et al. |
| 9,317,534 | B2 | 4/2016 | Brandt |
| 9,569,700 | B1 | 2/2017 | Santos et al. |
| 9,892,133 | B1 | 2/2018 | Biessmann et al. |
| 10,452,688 | B2 | 10/2019 | Heine et al. |
| 11,386,125 | B2 | 7/2022 | Heine et al. |
| 2001/0044795 | A1 | 11/2001 | Cohen et al. |
| 2003/0037034 | A1 | 2/2003 | Daniels et al. |
| 2005/0055357 | A1 | 3/2005 | Campbell |
| 2006/0288006 | A1 | 12/2006 | Eschbach et al. |
| 2009/0006343 | A1 | 1/2009 | Platt et al. |
| 2011/0282906 | A1 | 11/2011 | Wong |
| 2012/0109943 | A1 | 5/2012 | Yang et al. |
| 2013/0325724 | A1* | 12/2013 | Babatz ................ G06Q 20/405 705/44 |
| 2014/0046935 | A1 | 2/2014 | Bengio et al. |
| 2014/0180772 | A1 | 6/2014 | Fong et al. |
| 2014/0337176 | A1 | 11/2014 | Ruvini |
| 2014/0372951 | A1 | 12/2014 | Li et al. |
| 2015/0127430 | A1 | 5/2015 | Hammer, III |
| 2016/0048901 | A1 | 2/2016 | Bax et al. |
| 2016/0379132 | A1 | 12/2016 | Jin et al. |
| 2017/0148073 | A1 | 5/2017 | Nomula et al. |
| 2017/0161391 | A1 | 6/2017 | Li |
| 2018/0040064 | A1* | 2/2018 | Grigg ................... H04L 41/145 |
| 2018/0129724 | A1 | 5/2018 | Heine et al. |
| 2020/0125587 | A1 | 4/2020 | Heine et al. |

FOREIGN PATENT DOCUMENTS

| | | |
|---|---|---|
| CN | 103329126 A | 9/2013 |
| CN | 103430176 A | 12/2013 |
| CN | 103703466 A | 4/2014 |
| CN | 110073346 | 7/2019 |
| CN | 110073346 | 6/2023 |
| CN | 116756402 | 9/2023 |
| EP | 3538987 | 9/2019 |
| JP | 2013-088906 A | 5/2013 |
| JP | 2015-529908 A | 10/2015 |
| JP | 2016-527646 A | 9/2016 |
| JP | 2019536148 | 12/2019 |
| JP | 6831458 | 2/2021 |
| JP | 2021077394 | 5/2021 |
| JP | 7055228 | 4/2022 |
| KR | 20210060661 | 5/2021 |
| KR | 102353420 | 1/2022 |
| WO | WO-2016191346 A1 * | 12/2016 |
| WO | 2018/089326 A1 | 5/2018 |

OTHER PUBLICATIONS

U.S. Appl. No. 62/371,168, filed Aug. 4, 2016. (Year: 2016).*
Notice of Allowance received for Japanese Patent Application No. 2019-523759 , dated Dec. 1, 2020, 12 pages (6 pages of Official Copy & 6 pages of English Translation of Claims).
Notice of Allowance Received for Korean Patent Application No. 10-2019-7016127, dated Feb. 19, 2021, 9 Pages (3 pages of official copy & 6 pages of claims).
Notice of Allowance received for Korean Patent Application No. 10-2021-7015020 , dated Dec. 8, 2021, 3 Pages(2 Pages of Official Copy & 1 page of English Translation).
Office Action received for Chinese Patent Application No. 201780075895.7 dated Oct. 9, 2022, 9 Pages (1 Page of English Translation & 8 Pages of Official Copy).
Summons to Attend Oral Proceedings Received for European Patent Application No. 17870146.2, dated Nov. 14, 2022, 13 Pages.
Communication Pursuant to Article 94(3) EPC received for European Patent Application No. 17870146.2, dated Aug. 17, 2021, 12 Pages.
Extended European Search Report Received for European Patent Application No. 17870146.2, dated Sep. 4, 2019, 9 pages.
Final Office Action received for U.S. Appl. No. 16/578,774, dated Oct. 13, 2021, 13 pages.
Final Office Action received for U.S. Appl. No. 15/345,627, dated Jan. 10, 2019, 15 pages.
First Action Interview—Office Action Summary received for U.S. Appl. No. 15/345,627, dated Aug. 28, 2018, 7 pages.
First Action Inte, view-Pre Interview Communication received for U.S. Appl. No. 15/345,627, dated Jul. 6, 2018, 4 pages.
International Preliminary Report on Patentability received for PCT Patent Application No. PCT/US2017/060292, dated May 23, 2019, 10 pages.
International Search Report and Written Opinion of the International Searching Authority, issued in connection with Int'l Appl. No. PCT/US2017/060292 dated Jan. 18, 2018 (10 pages).
Li et al., "Query reformulation by leveraging crowd wisdom for scenario-based software search," In Proceedings of the 8th Asia-Pacific Symposium on Internetware, Sep. 18, 2016 (pp. 36-44). (Year: 2016).
Non-Final Office Action received for U.S. Appl. No. 16/578,774, dated Jun. 10, 2021, 13 pages.
Notice of Allowance received for Japanese Patent Application No. 2021-011820, dated Mar. 29, 2022 (3 pages translation, 3 pages untranslated), 6 pages.
Notice of Allowance received for U.S. Appl. No. 15/345,627, dated Jun. 14, 2019, 8 pages.
Notice of Allowance received for U.S. Appl. No. 16/578,774, dated Mar. 15, 2022, 8 pages.
Office Action received for Japanese Patent Application No. 2019-523759, dated Jun. 9, 2020, 6 pages (3 Pages of Official Copy and 3 Pages of English Translation).
Office Action received for Japanese Patent Application No. 2021-011820, dated Oct. 5, 2021, 6 Pages(1 Page of English Translation & 5 Pages of Official Copy).
Office Action received for Korean Patent Application No. 10-2019-7016127, dated Aug. 10, 2020, 15 pages (7 Pages of English Translation and 8 Pages of Official Copy) .
Office Action received for Korean Patent Application No. 10-2021-7015020, dated Jun. 29, 2021, 8 Pages (2 Pages of English Translation & 6 Pages of Official Copy).
Notice of Decision to Grant Received for Chinese Patent Application No. 201780075895.7, dated Mar. 1, 2023, 4 Pages (2 pages of English translation & 2 pages of official copy).
U.S. Appl. No. 15/345,627 U.S. Pat. No. 10,452,688, filed Nov. 8, 2016, Crowd Assisted Query System.
U.S. Appl. No. 16/578,774 U.S. Pat. No. 11,386,125, filed Sep. 23, 2019, Crowd Assisted Query System.
"U.S. Appl. No. 15/345,627, Examiner Interview Summary dated Feb. 11, 2019", 3 pgs.
"U.S. Appl. No. 15/345,627, Corrected Notice of Allowability dated Sep. 11, 2019", 2 pgs.
"U.S. Appl. No. 16/578,774, Preliminary Amendment filed Apr. 10, 2020", 8 pgs.
"U.S. Appl. No. 16/578,774, Examiner Interview Summary dated Dec. 3, 2021", 2 pgs.
"U.S. Appl. No. 16/578,774, Notice of Allowance dated May 17, 2022", 2 pgs.

(56) References Cited

OTHER PUBLICATIONS

"Japanese Application Serial No. 2021-011820, Written Amendment filed Apr. 7, 2021", w English Translation, 9 pgs.
"Chinese Application Serial No. 202310538448.8, Notification of Passing Preliminary Examination dated Jul. 13, 2023", With English translation, 3 pgs.

\* cited by examiner

CROWD ASSISTED QUERY SYSTEM

CROSS REFERENCES

This application is a continuation of U.S. patent application Ser. No. 16/578,774 by Heine et al., entitled "Crowd Assisted Query System," filed Sep. 23, 2019; which is a continuation of U.S. patent application Ser. No. 15/345,627 by Heine et al., entitled "Crowd Assisted Query System," filed Nov. 8, 2016, now U.S. Pat. No. 10,452,688, issued Oct. 22, 2019; each of which is hereby incorporated by reference in its entirety.

TECHNICAL FIELD

The subject matter of the present disclosure generally relates to user interfaces for client devices. In particular, example embodiments relate to a user interface to receive and display data objects to facilitate crowd assisted search queries.

BACKGROUND

The amount of electronically stored data in networked systems and marketplaces has grown tremendously. Much of the growth of the electronically stored data is a direct result of the sheer number of individuals that create and post item listings representative of items for sale. As anyone who has ever attempted to search these networked systems knows, the electronically stored data is practically useless unless it can be conveniently and accurately searched. Due to the vast amount of electronic data, and the often inconsistent naming conventions of item listings, finding specific items through standard search methods has become difficult if not impossible.

BRIEF DESCRIPTION OF THE DRAWINGS

Various ones of the appended drawings merely illustrate example embodiments of the present disclosure and are not intended to limit its scope to the illustrated embodiments. On the contrary, these examples are intended to cover alternatives, modifications, and equivalents as may be included within the scope of the disclosure.

DETAILED DESCRIPTION

Figure 1:
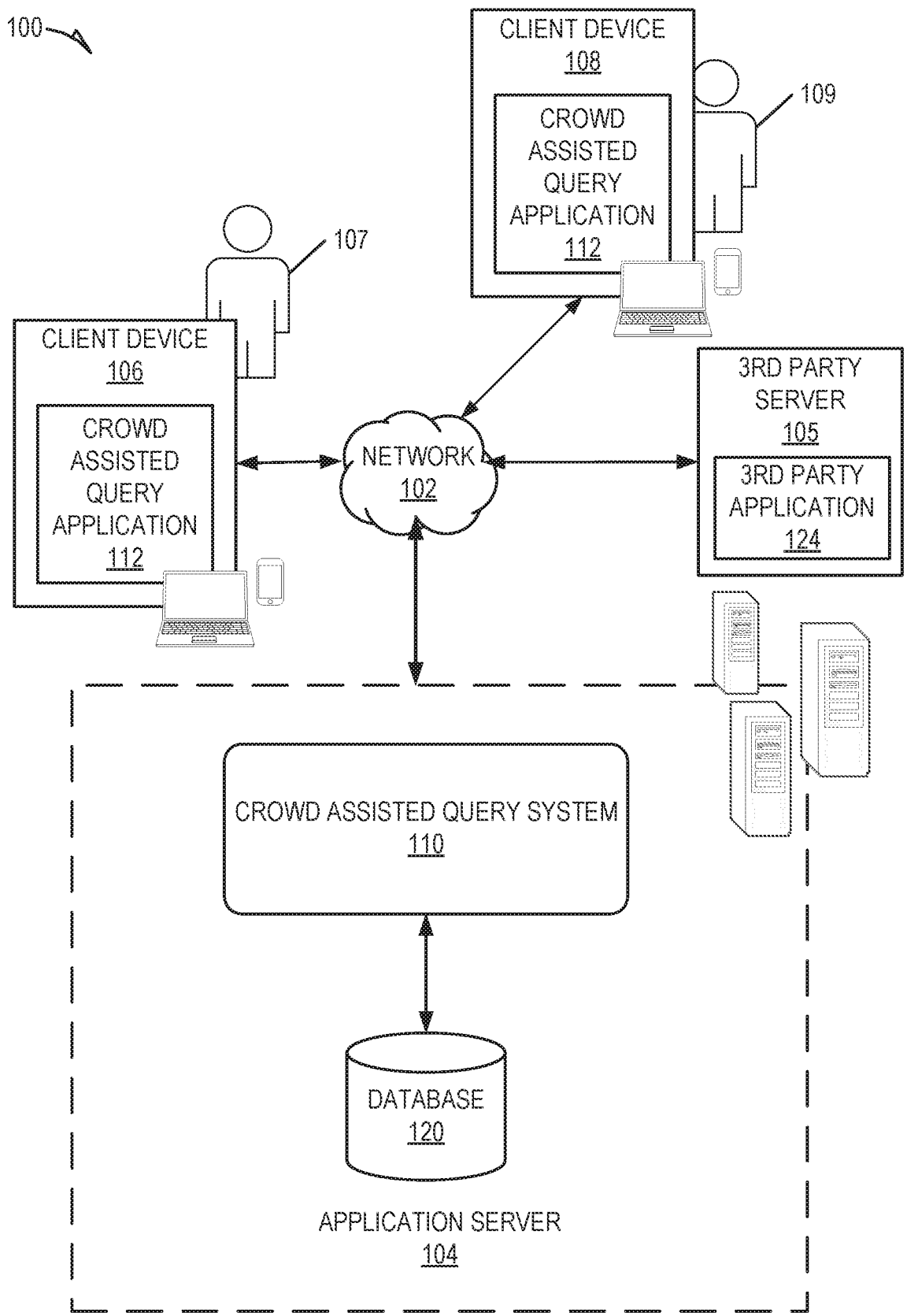
FIG. 1 is a network diagram illustrating a networked system having a client-server architecture configured for exchanging data over a network with a crowd assisted query system, according to example embodiments.

Reference will now be made in detail to specific example embodiments for carrying out the inventive subject matter of the present disclosure. In the following description, specific details are set forth in order to provide a thorough understanding of the subject matter. It shall be appreciated that embodiments may be practiced without some or all of these specific details.

Aspects of the present disclosure relate to a network-based crowd assisted query system that includes a client device in communication with an application server executing the crowd assisted query system over a network. For example, the crowd assisted query system may be or include a group of one or more server machines. Users of the crowd assisted query system are presented with a graphical user interface (GUI) configured to receive queries that include data objects, wherein the data objects include representations of unidentified items of interest to the user. The data objects may include media content, such as graphical images as well as audio data, and in some example embodiments may further include text data describing the unidentified items.

The crowd assisted query system is configured to generate and cause display of at least two different GUIs at client devices: a first GUI to receive query requests from client devices; and a second GUI to receive description suggestions on the queries from client devices. For example, the first GUI to receive query requests from client devices may include one or more fields in which a user may provide (e.g., upload) data objects such as media content to be appended to the query, such as graphical images, photos, audio content, and the like, as well as text data to further describe aspects of the media content. The media content may represent an item of interest to the user which the user is unable to identify. For example, the media content uploaded by the user may include a photograph of a chair, and/or a text string that states "leather lounge chair." In some example embodiments, the GUI may further include user selectable options to categorize the data object of the query, such as "furniture," or "jewelry," or "clothing." A single data object may have one or more associated data category.

The second GUI may include a presentation of representations of data objects uploaded by users in queries, organized by category, and configured to include fields to receive description suggestions from users familiar with the unidentified items represented by the data objects. For example, a description suggestion may include a string of text that describes the unidentified object represented by the data object (e.g., "Eames Chair"), as well as a reference to an item that meets the description of the data object (e.g., a link to an item listing for a similar item). A suggesting user may browse through the representations of data objects displayed within the second GUI and provide description suggestions through user inputs into the second GUI.

The crowd assisted query system receives queries that include a data object from a requesting user via the first GUI from a first client device. The data object includes media content depicting an unidentified item of interest to the requesting user. Upon receipt of the query, the crowd assisted query system parses the data objects from the query, and assigns the data object to an item category based on attributes of the data object. For example, the attributes may include features of the data object itself (e.g., image data of an image), as well as item category selections made by the requesting user (e.g., "clothing," "furniture," etc.).

Upon receiving and categorizing a data object from a query, the crowd assisted query system may receive a request to display queries within a second GUI in order to receive description suggestions from suggesting users. For example, a suggesting user may provide a user input into the second GUI requesting that the crowd assisted query system cause display of representations of data objects from queries in specified categories (e.g., "clothes," "furniture"), wherein the representations include fields to provide description suggestions. The suggesting user may browse through the data objects and provide description suggestions that include text strings as well as references to existing item listings.

The crowd assisted query system may cause display of a notification to the client device of the requesting user, and cause display of a presentation of a set of description suggestions received for the query. The requesting user may thereby review the available description suggestions and make a selection of the "best" description that matches the unidentified desired item. The requesting user may view the description suggestions provided by suggesting users and select the description suggestion that most closely matches the unidentified item depicted in the image. For example, the requesting user may explicitly select a description suggestion through a user input, or in some embodiments, the crowd assisted query system may detect a search request or purchase transaction conducted by the requesting user that includes the description suggestion.

In some example embodiments, the queries received from the requesting users include reward values assigned by the requesting user, wherein the reward values are offered to suggesting users in exchange for description suggestions. The requesting user may thereby review the description suggestions provided for a query and select the "best" match. In response to receiving the selection, the reward value is awarded to the corresponding suggesting user by the crowd assisted query system.

In response to receiving the selection of the description selection by the requesting user, the crowd assisted query system ranks the description suggestions associated with the data object. For example, the description suggestions selected by the requested user may be ranked more highly than description suggestions not selected by the requesting user. In some example embodiments, the requesting user may also provide a user input indicating that a particular description suggestion does not match the query, and should be removed as an option.

In further example embodiments, the description selections may be further ranked based on attributes of the suggesting users. User attributes may include: frequency with which a suggestion user submits description suggestions; a rate at which description suggestions from a suggesting user are selected; as well as an area of expertise of a suggesting user (e.g., "clothing," furniture," "technology"). For example, description suggestions from suggesting users that submit description suggestions that are selected frequently may be ranked more highly than a description suggestion from a first time suggester.

As an illustrative example from a user perspective, consider the following example. A user sees an item they like, for example a chair, but they have no way of determining what to search for within a networked marketplace in order to locate the item. The user takes a photo of the chair with a mobile device, and uploads the image of the chair into a GUI of the crowd assisted search system. In the process of uploading the photo of the chair, the user may additionally provide user inputs to indicate an item category for the chair (e.g., furniture), as well as descriptive information to further indicate what they are searching for (e.g., "leather 60s modern lounge chair"). The user attaches a "bounty" (e.g., reward value) to the photo of the chair, wherein the bounty is offered in exchange for a group of suggesting users to provide description suggestions identifying what exactly the user should be looking for. For example, if a description suggestion is selected by the requesting user, the suggesting user is awarded the bounty.

Having uploaded the photo of the chair into the GUI, the crowd assisted query system causes display of a representation of the chair within a feed populated with other similar items (e.g., based on item category). Suggesting users may browse through the feed and provide description suggestions on items which they are able to identify. For example, a suggesting user may come upon the photo of the chair uploaded by the requesting user, and based on the photo and the descriptive information, may know what to search for. The suggesting user may provide a description suggestion that comprises a text string or reference to an item or item listing that matches the chair in the photo. The suggesting user may provide a text string that indicates "Eames Chair," or a uniform resource locator (URL) that leads to an item listing for a matching item. In this way, suggesting users provide description suggestions to the representation of the photo of the chair received from the requesting user.

The crowd assisted query system notifies the requesting user that one or more description suggestions have been received from suggesting users. The requesting user reviews the available description suggestions in order to select the "best" description available that matches the item they were searching for most closely. The user may provide inputs indicating when a description suggestion is wrong, or when the description suggestion is correct. The crowd assisted query system may conduct a search of a networked marketplace or search engine in response to the user selecting one or more of the description suggestions. Having determined that the description suggestion for "Eames Chair" is a match to the item the user was searching for, the crowd assisted query system awards the bounty to the corresponding suggesting user.

Having determined that the description suggestion indicating that the photo of the chair is an "Eames Chair," the crowd assisted query system associated the description suggestion with the photo of the chair within an artificial intelligence (AI) database. In this way, the crowd assisted query system populates the AI database with description suggestions and data objects (e.g., photos and media items of requests from requesting users). Ultimately, with enough entries (e.g., requests and suggestions), the crowd assisted query system may train an image search AI that would then be able to identify items based on a visual search alone, such that a user could provide an image of an item and the system would be able to identify what the item is based on the image alone, with much greater specificity than just "chair," or "shirt."

FIG. 1 is a network diagram depicting a networked system 100 having a client-server architecture configured for exchanging data over a network 102 with an application server 104, according to example embodiments. While the networked system 100 is depicted as having a client-server architecture, the present inventive subject matter is, of course, not limited to such an architecture, and could equally well find application in an event-driven, distributed, or peer-to-peer architecture system, for example. Further, to avoid obscuring the inventive subject matter with unnecessary detail, various functional components that are not germane to conveying an understanding of the inventive subject matter have been omitted from FIG. 1. Moreover, it shall be appreciated that although the various functional components of the networked system 100 are discussed in a singular sense, multiple instances of any one of the various functional components may be employed.

As shown, the networked system 100 includes the application server 104 in communication with client device(s) 106 and a third party server 105 over the network 102. The application server 104 communicates and exchanges data with entities within the networked system 100 that pertain to various functions and aspects associated with the networked system 100 and its users. These data exchanges may include transmitting, receiving (communicating), and processing data to, from, and regarding content and users of the networked system 100.

The application server 104 includes a crowd assisted query system 110 to provide server-side functionality, via the network 102 (e.g., the Internet), to client devices such as the client device 106, and the client device 108.

The client devices 106 and 108 may be any sort of mobile device (e.g., smart phone, tablet computer, or wearable device) that includes input/output components (e.g., touch screen) for displaying content and receiving user inputs, and a crowd assisted query application 112 specifically designed for interacting with the application server 104. For example, a user 107 or 109 may use the crowd assisted query application 112 executing on the client devices 106 and 108 to upload queries or suggestions to the queries through a GUI generated by the application server 104. The crowd assisted query application 112 may, in some embodiments, when executed by the client device 106, configure the client device 106 to perform any of the methodologies described herein.

Turning specifically to the application server 104, the application server 104 includes the crowd assisted query system 110 and a database 120. In some embodiments, the application server 104 may include an Application Programming Interface (API) server and/or a web server coupled to (e.g., via wired or wireless interfaces) the crowd assisted query system 110 to provide programmatic and/or web interfaces respectively to the client devices 106 and 108. The application server 104 may, in some embodiments, also include a database server coupled to the crowd assisted query system 110 to facilitate access to the database 120. The database 120 may include multiple databases that may be internal or external to the application server 104.

The crowd assisted query system 110 hosts one or more applications such as a server-side navigation menu application that provides navigation services to users (e.g., user 107) who access the application server 104. For example, a user 107 may use the crowd assisted query application 112 executing on the client device 106 to display an interface to upload a query request that includes a set of data objects (e.g., media content, reward value, etc.). The user 107 may for example upload images, description information, and the like through the interface at the client device 106. A user 109 may use the crowd assisted query application 112 executing on the client device 108 to provide description suggestions through an interface configured to display query requests received from users. For example, the interface may include a presentation of one or more query requests in a browseable feed.

The database 120 stores data pertaining to various functions and aspects associated with the networked system 100 and its users. For example, the database 120 may include a database that stores item listings and inventory information of a networked marketplace, as well as an AI database that includes training data to train an AI module of the crowd assisted query system 110. The database 120 may also include databases to maintain user account records for users of the application server 104. Each user account record is a data structure that includes information that describes aspects of a particular user.

FIG. 1 also illustrates a third party application 124 executing on the third party server 105 that may offer information or services to the crowd assisted query system 110 or to users of the client device 106. For example, the third party application 124 may be associated with any organization that conducts transactions with or provides services to users of the client device 106, such as a network-based marketplace. In some embodiments, the incentives provided to users may be redeemed or otherwise used with the third party application 124.

Figure 2:
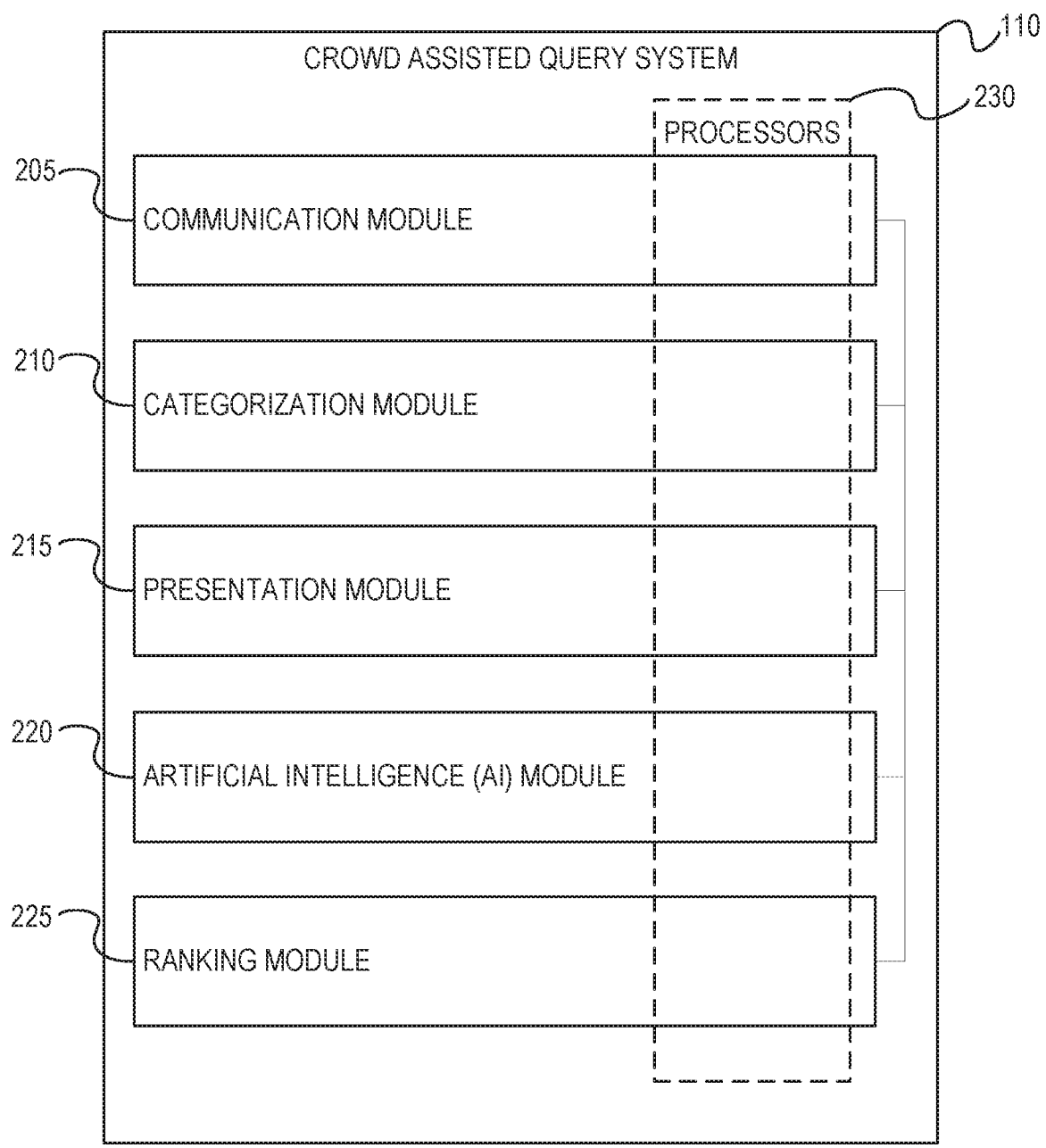
FIG. 2 is a block diagram illustrating various functional components of a crowd assisted query system, which is provided as part of the networked system, according to example embodiments.

FIG. 2 is a block diagram illustrating components of the crowd assisted query system 110 that configure the crowd assisted query system 110 to provide a query request interface at the client device 106 to receive query requests that include data objects, generate and cause display of a feed of query requests within a suggestion interface at the client device 108, receive description suggestions, associate the description suggestions with a data object within the database 120, and train an AI module to perform an image based search, according to some example embodiments. The crowd assisted query system 110 is shown as including a communication module 205, a categorization module 210, a presentation module 215, an artificial intelligence (AI) module 220, and a ranking module 225, all configured to communicate with each other (e.g., via a bus, shared memory, or a switch). Any one or more of these modules may be implemented using one or more processors 230 (e.g., by configuring such one or more processors to perform functions described for that module) and hence may include one or more of the processors 230.

Any one or more of the modules described may be implemented using dedicated hardware alone (e.g., one or more of the processors 230 of a machine) or a combination of hardware and software. For example, any module described of the crowd assisted query system 110 may physically include an arrangement of one or more of the processors 230 (e.g., a subset of or among the one or more processors of the machine) configured to perform the operations described herein for that module. As another example, any module of the crowd assisted query system 110 may include software, hardware, or both, that configure an arrangement of one or more processors 230 (e.g., among the one or more processors of the machine) to perform the operations described herein for that module. Accordingly, different modules of the crowd assisted query system 110 may include and configure different arrangements of such processors 230 or a single arrangement of such processors 230 at different points in time. Moreover, any two or more modules of the crowd assisted query system 110 may be combined into a single module, and the functions described herein for a single module may be subdivided among multiple modules. Furthermore, according to various example embodiments, modules described herein as being implemented within a single machine, database, or device may be distributed across multiple machines, databases, or devices.

Figure 3:
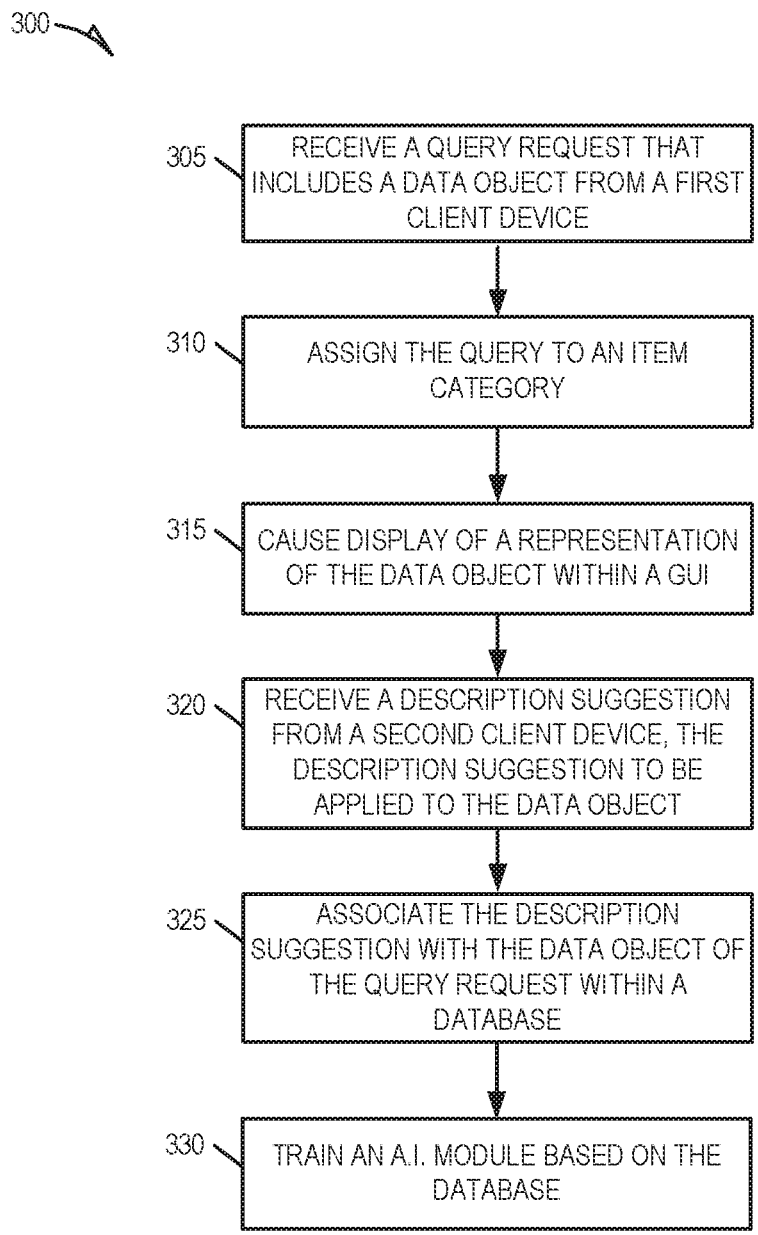
FIG. 3 is a flow chart illustrating a method for populating a training database to train an artificial intelligence module, according to an example embodiment.

FIG. 3 is a flow chart illustrating a method 300 for populating a training database to train an AI module, according to an example embodiment. The method 300 may be embodied in computer-readable instructions for execution by one or more processors (e.g., processors 230 of FIG. 2) such that the steps of the method 300 may be performed in part or in whole by functional components (e.g., modules) of the client device 106 or the crowd assisted query system 110; accordingly, the method 300 is described below by way of example with reference thereto. However, it shall be appreciated that the method 300 may be deployed on various other hardware configurations and is not intended to be limited to the functional components of the client device 106 or the crowd assisted query system 110.

At operation 305, the communication module 205 receives a query request from the client device 106. The query request may include one or more data objects representative of an item of interest to the requesting user. The item of interest may be an unidentified item that the user wishes to search for, but does not know how. For example, the item of interest may be a chair that the user 107 sees and takes a picture of. The crowd assisted query system 110 causes display of a query request interface at the client device 106, wherein the query request interface includes a field to upload data objects representative of the item. For example, the data objects may include images and text strings, as well as a selection of an item category. In some example embodiments, the user 107 may additionally provide a reward value to be assigned to the query request, offered in exchange for the identification of the item depicted in the query request by a suggesting user.

At operation 310, the categorization module 210 assigns the query request to an item category based on the data objects of the query request. For example, the categorization module 210 may assign the query request based on the image data alone (e.g., in instances where the user 107 has not provided an item category), based on image and object recognition techniques. For example, the AI module 220 may apply a convolutional neural network in order to identify an item category that best matches the item depicted in the image provided by the user 107. In some embodiments, the categorization module 210 may simply categorize the query request based on the category selected by the user 107, or the text description provided by the user 107.

At operation 315, the presentation module 215 causes display of a suggestion interface at the client device 108. The user 109 may for example be a suggester that wishes to provide description suggestions for one or more query requests from requesting users. The user 109 may select a query request category, and in response the presentation module 215 causes display of a feed that includes representations of one or more query requests assigned to the query request category selected. The representations may include an image associated with each query request, the corresponding reward value, and any text information that the requesting user provided in the query request. The user 109 may scroll through the feed and select one or more query requests that he wishes to provide description suggestions for.

At operation 320, the communication module 205 receives a description suggestion from the user 109. For example, the user 109 may select a query request from among a set of query requests presented in the suggestion interface at the client device 108. In response to selecting the query request from among the set of query requests, the presentation module 215 causes display of one or more fields for the user 109 to provide a description suggestion that identifies the item depicted in the query requests. The description suggestion may include a text string, as well as a reference to an item at the third party server 105 (e.g., a URL).

At operation 325, the categorization module 210 associates the description suggestion provided by the user 109 with the data object(s) of the query request within a database (e.g., the database 120). For example, the database 120 may include an AI database useable to train the AI module 220 to accurately identify items based on text or audio inputs (e.g., natural language speech), or based on image data alone. At operation 330, the crowd assisted query system 110 trains the AI module 220 based on the database 120. For example, the crowd assisted query system 110 may use the database 120 to determine correlations between the description suggestions and the image data. The correlations may thereby be applied to train the AI module 220.

Figure 4:
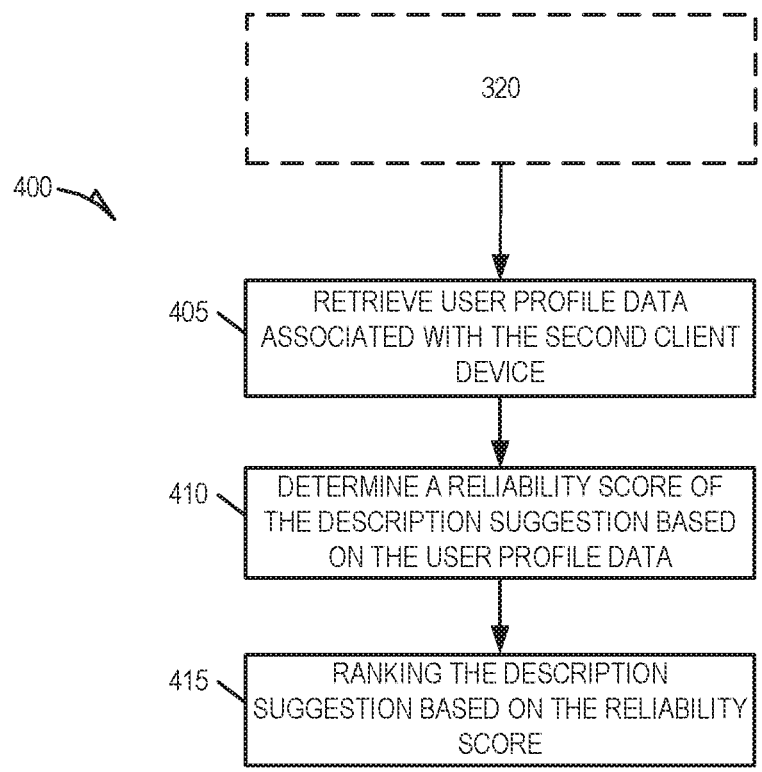
FIG. 4 is a flow chart illustrating a method for ranking a description suggestion provided by a user by the crowd assisted query system, according to an example embodiment.

FIG. 4 is a flow chart illustrating a method 400 for ranking a description suggestion provided by a user 109 by the crowd assisted query system 110, according to an example embodiment. The method 400 may be embodied in computer-readable instructions for execution by one or more processors (e.g., processors 230) such that the steps of the method 400 may be performed in part or in whole by functional components (e.g., modules) of the client device 106 or the crowd assisted query system 110; accordingly, the method 400 is described below by way of example with reference thereto. However, it shall be appreciated that the method 400 may be deployed on various other hardware configurations and is not intended to be limited to the functional components of the client device 106 or the crowd assisted query system 110.

One or more operations 405, 410, and 415 of the method 400 may be performed as part (e.g., a precursor task, a subroutine, or portion) of the method 300, in which the crowd assisted query system 110 trains the AI module 220, according to some example embodiments.

At operation 405, in response to receiving the description suggestion from the user 109 at operation 320, as discussed in FIG. 3, the communication module 205 accesses a user profile associated with the user 109 to retrieve user profile data. The user profile data may include a list of query request categories that the user 109 has provided description suggestions to, a number of description suggestions from the user 109 that have been selected by requesters, and an area of expertise of the user 109.

At operation 410, the ranking module 225 calculates a reliability score of the description suggestion provided by the user 109 on the query request based on the user profile data. The ranking module 225 may calculate the reliability score based on the number of description suggestions from the user 109, the number of description suggestions from the user 109 that have been selected by requesters, and the area of expertise of the user 109. For example, the user 109 may have an area of expertise, wherein the area of expertise indicates an item category that the user 109 has experience or knowledge about. The area of expertise may be determined based on explicit selection or indication by the user 109, or based on user feedback (e.g., users may promote the user 109 in a certain item category).

Having calculated a reliability score of the description suggestion, at operation 415 the ranking module 225 ranks the description suggestion against one or more description suggestions associated with the query request. For example, multiple suggesting users may provide description suggestions for any one query request. By ranking the description suggestions based on a reliability score calculated by the ranking module 225, the crowd assisted query system 110 may surface and more readily identify accurate description suggestions. In some example embodiments, the presentation module 215 causes display of the description suggestions to the user 107 in an order based on the ranking by the ranking module 225.

Figure 5:
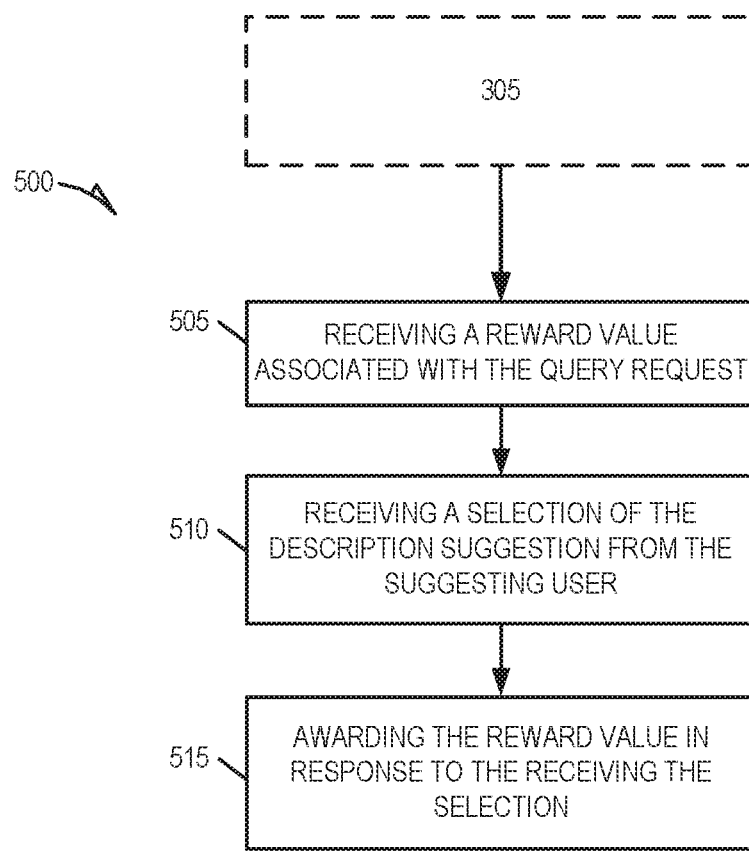
FIG. 5 is a flow chart illustrating a method for receiving a reward value associated with the query request, wherein the reward value is offered in exchange for identification of the unidentified item of the query request by a description suggestion, according to an example embodiment.

FIG. 5 is a flow chart illustrating a method 500 for receiving a reward value associated with the query request, wherein the reward value is offered in exchange for identification of the unidentified item of the query request by a description suggestion, according to an example embodiment. The method 500 may be embodied in computer-readable instructions for execution by one or more processors (e.g., processors 230) such that the steps of the method 500 may be performed in part or in whole by functional components (e.g., modules) of the client device 106 or the crowd assisted query system 110; accordingly, the method 500 is described below by way of example with reference thereto. However, it shall be appreciated that the method 500 may be deployed on various other hardware configurations and is not intended to be limited to the functional components of the client device 106 or the crowd assisted query system 110.

One or more operations 505, 510, and 515 of the method 500 may be performed as part (e.g., a precursor task, a subroutine, or portion) of the method 300, in which the crowd assisted query system 110 generates and causes display of a navigation menu at a client device 106, according to some example embodiments.

At operation 505, the communication module 205 receives a reward value with the query request from the client device 106. The query request may include one or more data objects that include a reward value specified by the user 107. The reward value is an amount offered by the user 107 in exchange for identification of an item (or service) associated with the query request. For example, the user 107 may offer $1 for any user that can identify or otherwise provide a description suggestion that matches the item represented in the query request from the user 107.

At operation 510, the user 107 selects a description suggestion from among one or more description suggestions received from users including the user 109. For example, suggesting users may view the query request from the user 107 within a suggestion interface displayed by the crowd assisted query system 110 in order to provide description suggestions. The crowd assisted query system 110 notifies the requesting user (user 107) of the description suggestions received, and causes display of a notification at the client device 106 that may include a display of the description suggestions. The user 107 may thereby review the description suggestions received and provide a selection of the "best" description suggestion that matches the query request.

In some example embodiments, the selection from the user 107 may be based on an explicit selection of a description suggestion through an interface provided by the presentation module 215. For example, the presentation module 215 may cause display of an interface at the client device 106 that includes a set of one or more description suggestions of which the user 107 may make a selection. In further embodiments, the selection may be based on search requests or transactions by the user 107. For example, the user 107 may conduct a search request based on a description suggestion from among the set of description suggestions, or purchase an item identified by a description suggestion from among the description suggestions (e.g., includes a title or description that includes the description suggestion).

At operation 515, in response to receiving the selection of the description suggestion from the user 107, the crowd assisted query system 110 awards the reward value to the appropriate user based on the description suggestion selected. For example, the crowd assisted query system 110 may award the reward value to the user that provided the selected description suggestion. The crowd assisted query system 110 may, for example, access a financial account associated with the requesting user and retrieve the reward value to deliver to the user that provided the selected description suggestion.

Figure 6:
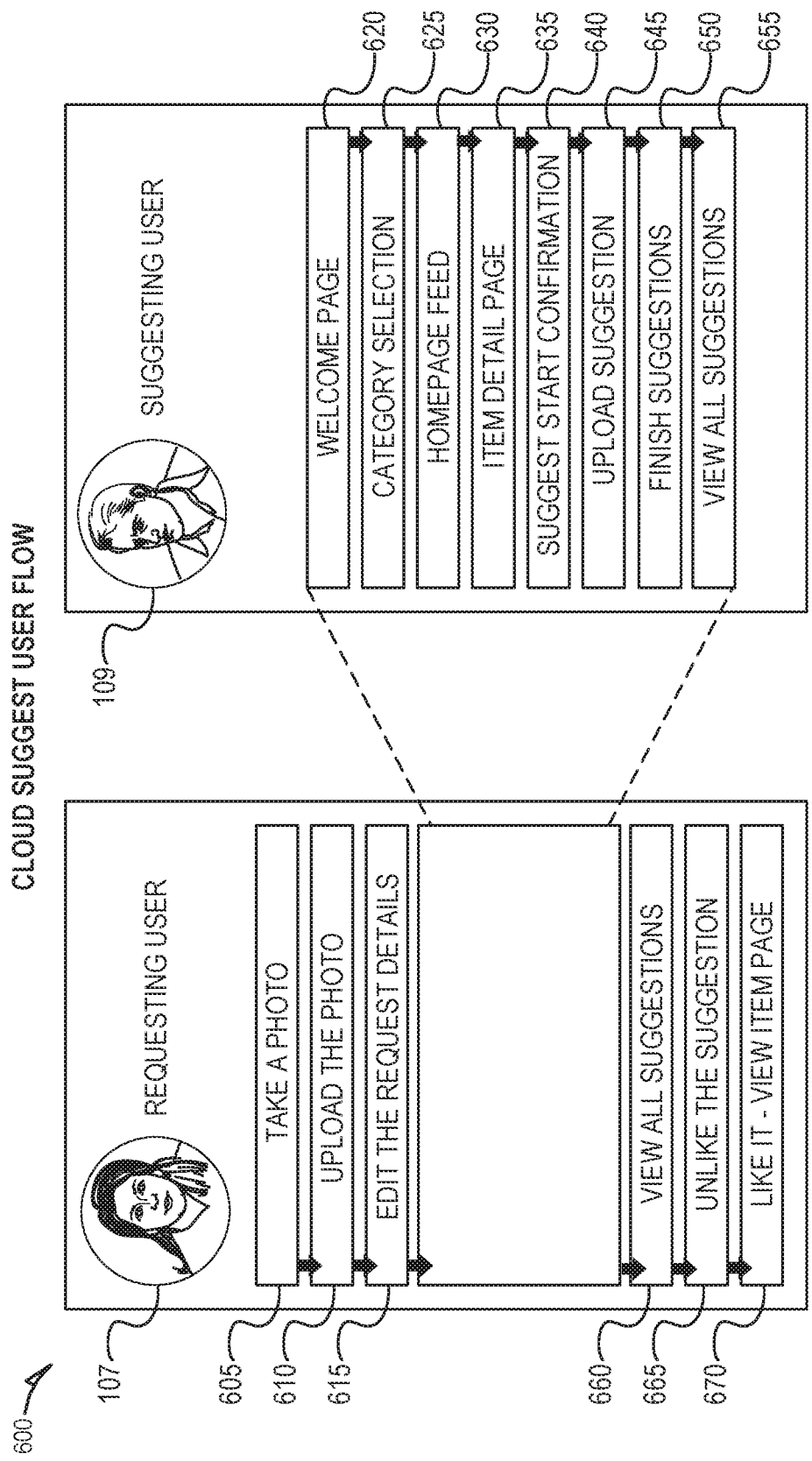
FIG. 6 is a diagram depicting an event flow of a requesting user and a suggesting user, according to an example embodiment.

FIG. 6 is a diagram depicting an event flow 600 of a requesting user (e.g., user 107) and a suggesting user (e.g., user 109), according to an example embodiment. The event flow 600 may be executed by the users 107 and 109 via client devices 106 and 108.

A requesting user (e.g., user 107) submits a query request to the crowd assisted query system 110. To submit the query request, at operation 605, the user 107 takes (or otherwise selects) a photo of an item which the user 107 then uploads to the crowd assisted query system 110 (e.g., via the client device 106). In some embodiments, the user 107 may upload a photo, and/or a media item that depicts or describes the item. For example, in lieu of a photo (or as a supplement), the user 107 may provide audio or text data describing an item (e.g., text or audio that states "a red patio chair with three legs").

Having uploaded the photo with the query request, at operation 615 the user 107 edits the request details. The request details include item category information, and text data that includes a description of the item. For example, the user 107 may select an item category for the query request (e.g., "furniture").

At operation 620, a suggesting user (e.g., user 109) launches the crowd assisted query application 112 on the client device 108. The suggesting user selects a category at operation 625, and at operation 630, the crowd assisted query system 110 causes display of a feed of query requests associated with the item category selected by the user 109. In some embodiments, the suggesting user may select multiple item categories to view in a feed simultaneously.

At operation 635, the suggesting user selects a query request, such as the query request submitted by the requesting user (e.g., user 107). In response to receiving the selection, the crowd assisted query system 110 causes display of an item detail page that includes a presentation of the photo uploaded by the requesting user, as well as additional item details such as description information. At operation 640, the suggesting user provides an input to initiate a suggestion to the query request. At operation 645, the suggesting user inputs and uploads a suggestion associated with the query request selected. The suggestion may include a text string as well as a reference to an item located at a third-party server 105. At operation 650, the suggesting user 109 finishes the suggesting process. In some embodiments, at operation 655 the suggesting user may view one or more suggestions from other suggesting users associated with the selected query request. In response to finishing the suggesting process, the crowd assisted query system 110 notifies the requesting user of the suggestions via a notification presented at the client device 106.

At operation 660, the requesting user may view all suggestions associated with the query request uploaded. The suggestions may be displayed to the requesting user in a feed such that the requesting user may "like" or "unlike" suggestions. For example, at operation 665, the requesting user may "unlike" a suggestion, which results in the suggestion being removed from the set, or as in operation 670, may "like" the suggestion, which may cause the suggestion to be linked to the photo of the query request.

Figure 7:
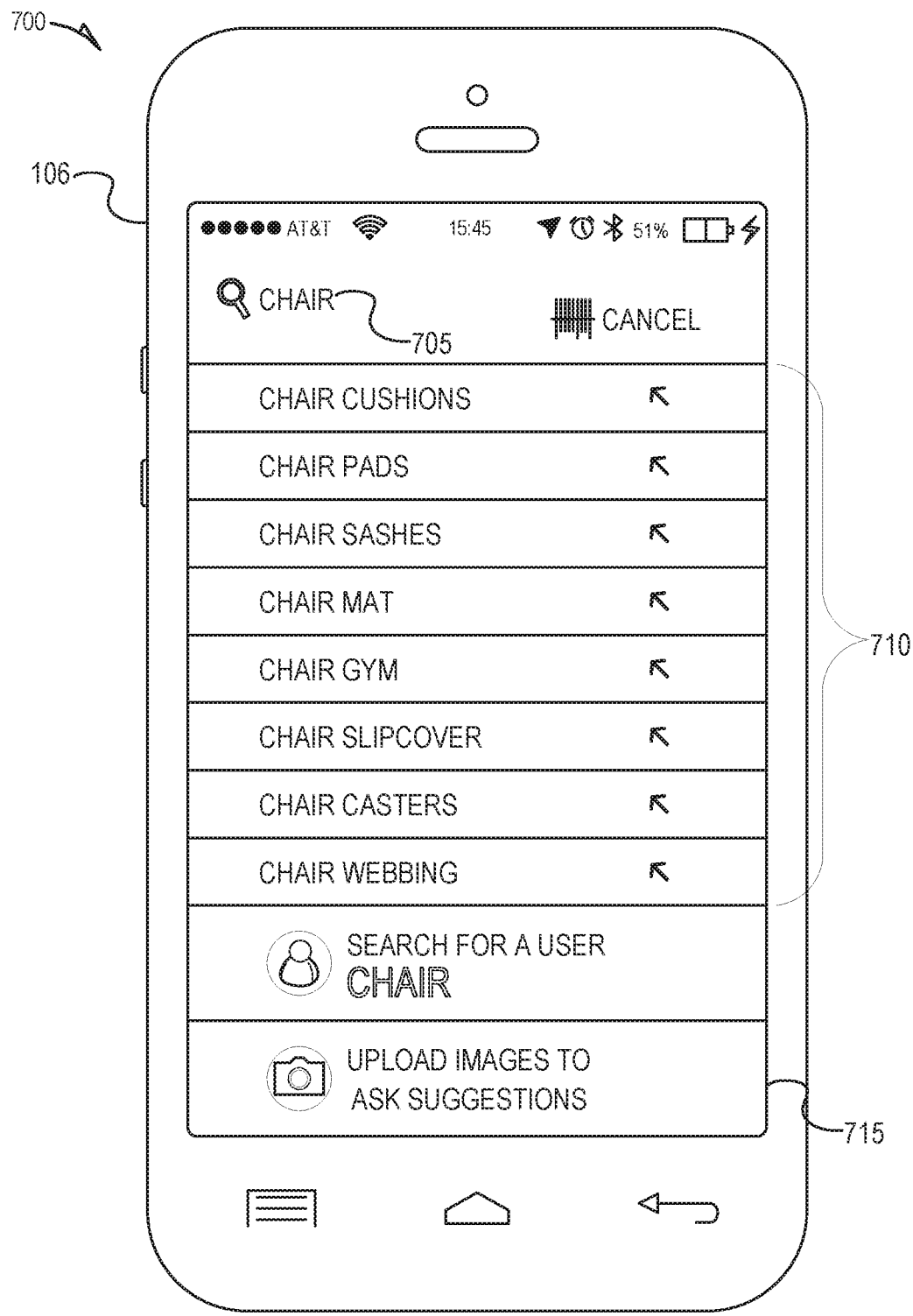
FIG. 7 is an interface diagram illustrating a user interface for receiving a query request, according to an example embodiment.

FIG. 7 is an interface diagram illustrating a user interface 700 for receiving a query request, according to an example embodiment. The user interface 700 may be presented on a touch-enabled mobile device such as the client device 106. The user interface 700 is shown to include a search request field 705, automatic query suggestions 710, and a graphical icon 715 to receive a query request from the user 107.

A user 107 may provide a search request into the search request field 705 of the user interface 700. In response, the crowd assisted query system 110 may cause display of a set of query suggestions 710 based on the search request. The set of query suggestions 710 may be based on a transaction history of the user 107 and the search request entered in the search request field 705. The user 107 may instead choose to initiate a query request via an input to the graphical icon 715.

Figure 8:
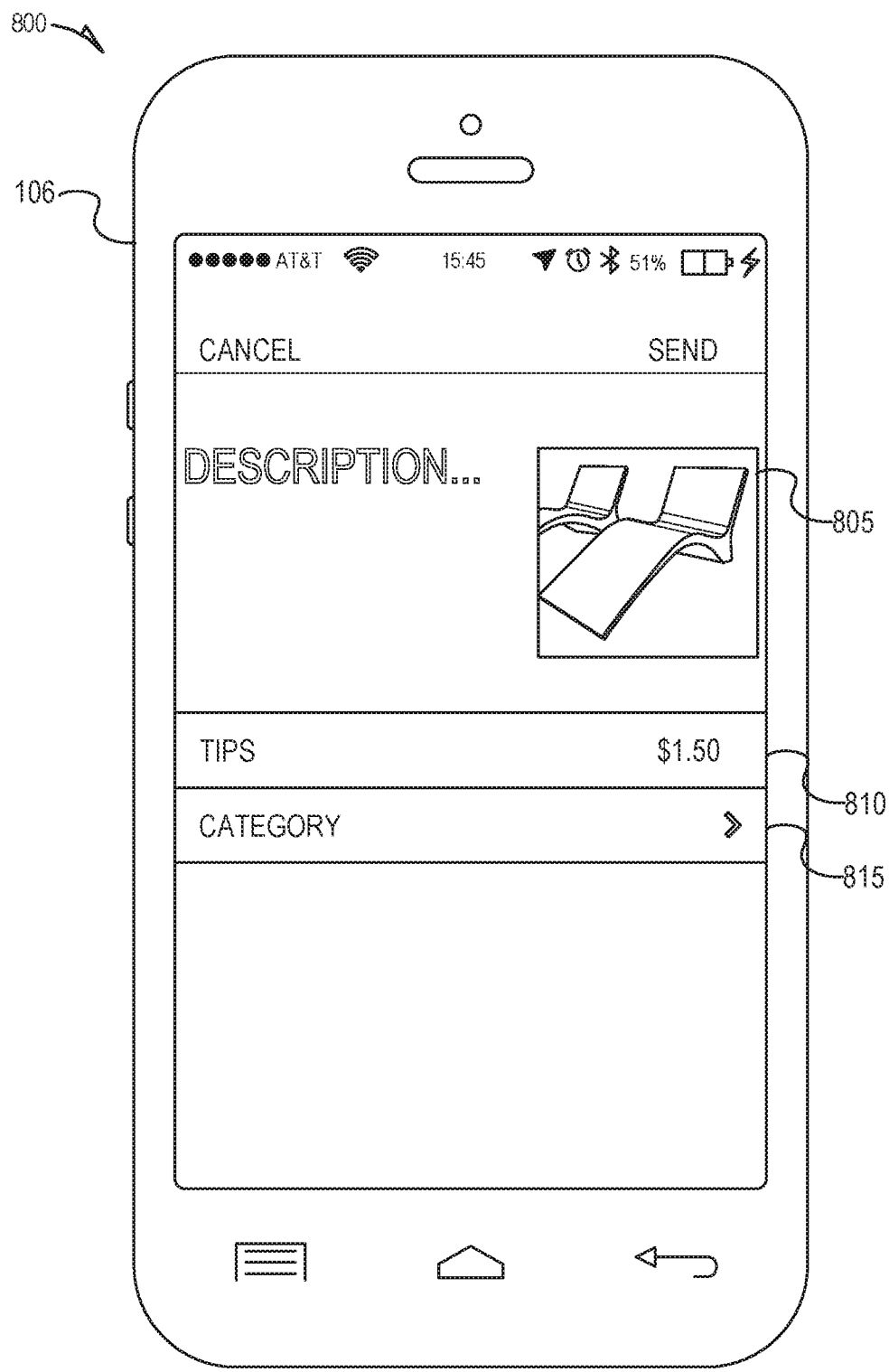
FIG. 8 is an interface diagram illustrating a query request interface to receive query requests, according to an example embodiment.

FIG. 8 is an interface diagram illustrating a query request interface 800 (e.g., displayed at a client device 106) to receive query requests, according to an example embodiment. The query request interface 800 is shown to include a display of an image 805 uploaded by a requesting user (e.g., user 107), a reward entry field 810 to receive a reward value to assign to the query request, as well as a category selection menu 815 to receive a selection of an item category associated with the query request.

In some example embodiments, the query request interface 800 is displayed at the client device 106 in response to receiving a user input to initiate a query request, for example via the graphical icon 715 of FIG. 7. The query request interface 800 is configured to receive query requests. The query requests include data objects such as the image 805, an object category, text data, as well as a reward value. For example, having selected an image to upload, the user 107 may provide additional text data describing the image (or specific features of the image). The user 107 provides a reward value into the reward entry field 810, and may specify an item category via the category selection menu 815. For example, in response to receiving a selection of the category selection menu 815, the crowd assisted query system 110 may cause display of a set of object categories from which the user 107 may select one or more.

Figure 9:
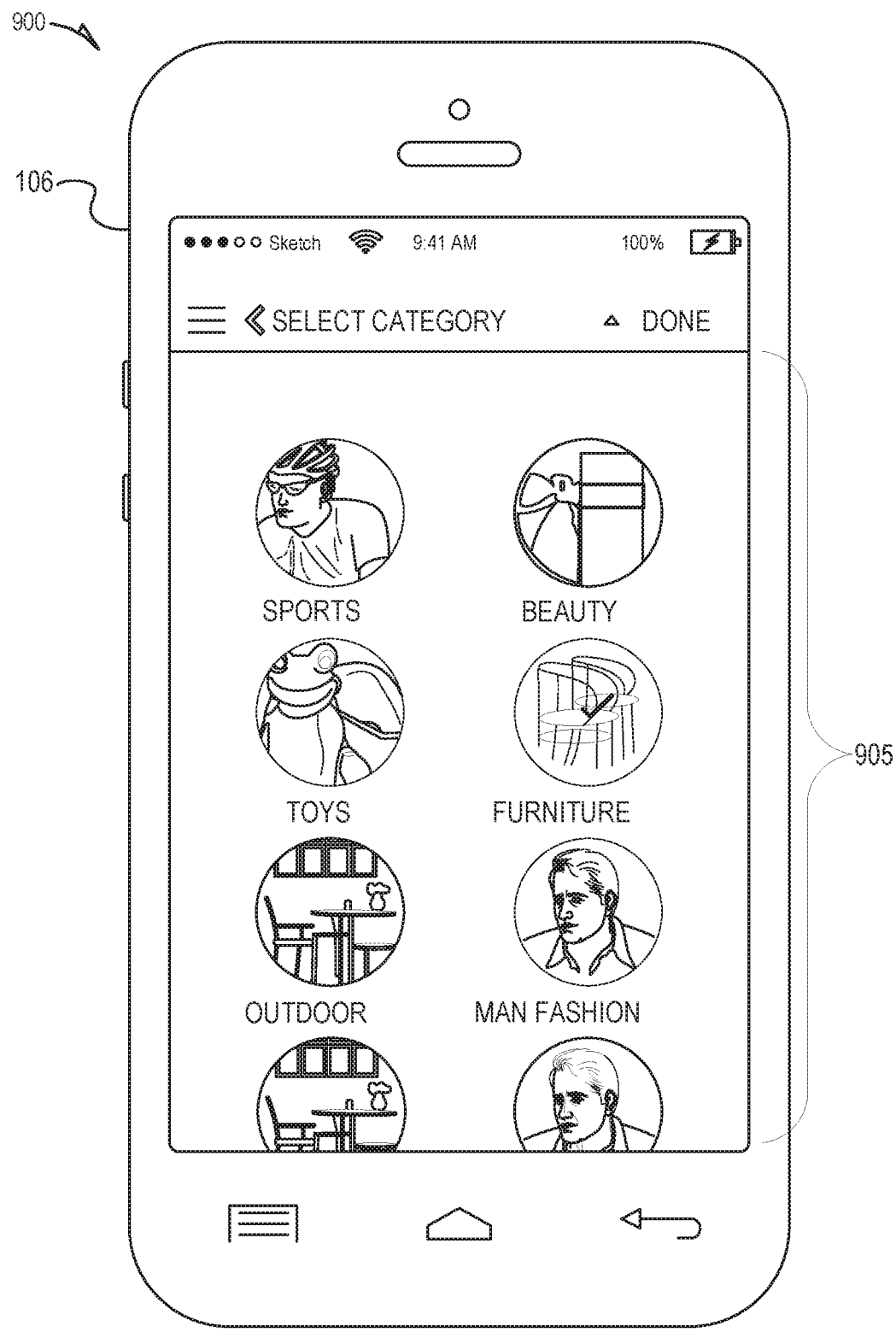
FIG. 9 is an interface diagram illustrating a suggestion interface to receive query suggestions, according to an example embodiment.

FIG. 9 is an interface diagram illustrating a suggestion interface 900 (e.g., displayed at a client device 108) configured to receive query suggestions, according to an example embodiment. As shown in FIG. 9, the suggestion interface 900 is shown to include a set of graphical elements representative of item categories 905. A suggesting user (e.g., user 109) may select an item category from among the set of item categories 905, and in response, the crowd assisted query system 110 causes display of a corresponding set of query requests assigned to the selected item category. The suggesting user may thereby view the set of query requests to provide query suggestions in exchange for the corresponding reward values.

Figure 10:
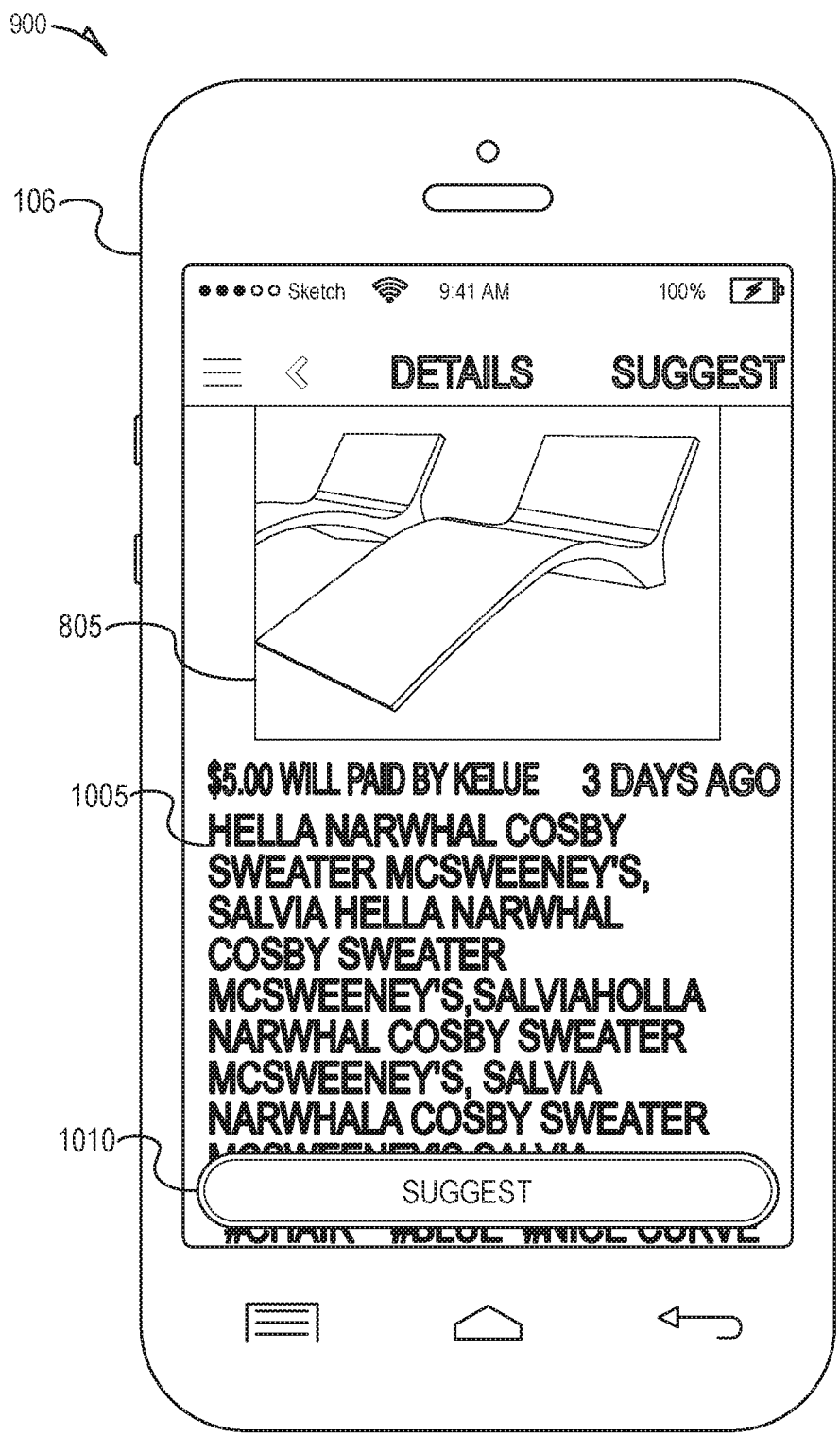
FIG. 10 is an interface diagram illustrating the suggestion interface configured to receive a query suggestion, according to an example embodiment.

FIG. 10 is an interface diagram illustrating the suggestion interface 900 configured to receive a query suggestion, according to an example embodiment. The suggestion interface 900 is shown to include a depiction of the image 805 of a query request submitted by a requesting user (e.g., the user 107). A suggesting user (e.g., user 109) may provide a query suggestion through the suggestion interface 900 by providing the text data 1005. In some example embodiments, the user 109 may provide a reference to an item located at the third-party server 105. Having provided the text data 1005, the user 109 may provide an input into the suggestion icon 1010, and in response, the crowd assisted query system 110 may index the query suggestion at a memory location associated with the query request, and the image 805, within the database 120.

In some example embodiments, in response to receiving the input into the suggestion icon 1010, the crowd assisted query system 110 causes display of a notification at the client device 106, to notify the requesting user (e.g., user 107) of the query suggestion. The requesting user may thereby view query suggestions in order to "like," "unlike," or remove the query suggestions from the database 120.

Machine Architecture

Figure 11:
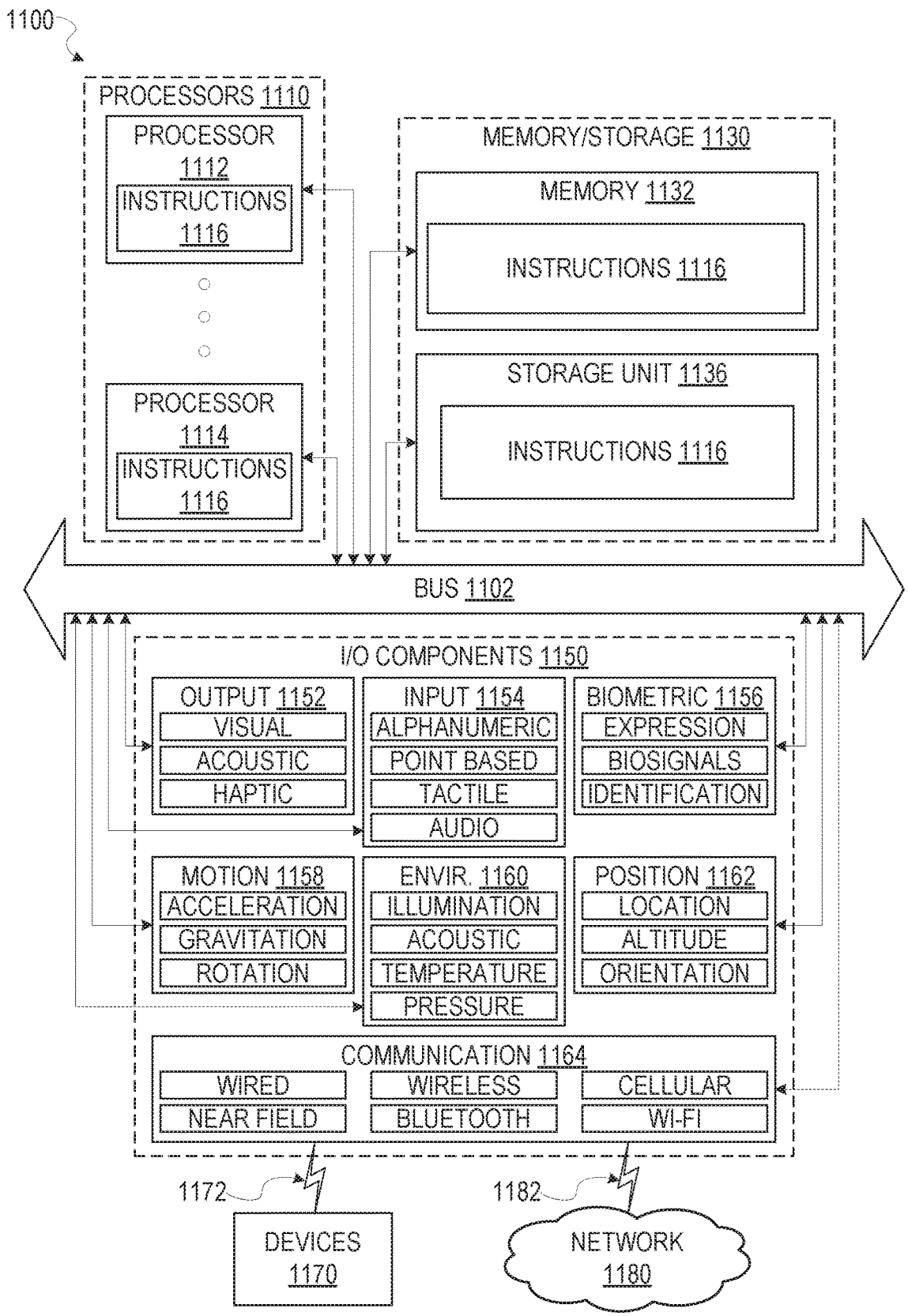
FIG. 11 is a diagrammatic representation of a machine in the example form of a computer system within which a set of instructions for causing the machine to perform any one or more of the methodologies discussed herein may be executed.

FIG. 11 is a block diagram illustrating components of a machine 1100, according to some example embodiments, able to read instructions from a machine-readable medium (e.g., a machine-readable storage medium) and perform any one or more of the methodologies discussed herein. Specifically, FIG. 11 shows a diagrammatic representation of the machine 1100 in the example form of a computer system, within which instructions 1116 (e.g., software, a program, an application, an applet, an app, or other executable code) for causing the machine 1100 to perform any one or more of the methodologies discussed herein may be executed. These instructions transform the general, non-programmed machine into a specially configured machine programmed to carry out the described and illustrated functions described herein. Consistent with some embodiments, the machine 1100 may correspond to the client device 106 or the crowd assisted query system 110.

The machine 1100 may operate as a standalone device or may be coupled (e.g., networked) to other machines. In a networked deployment, the machine 1100 may operate in the capacity of a server machine or a client machine in a server-client network environment, or as a peer machine in a peer-to-peer (or distributed) network environment. By way of non-limiting example, the machine 1100 may comprise or correspond to a server computer, a client computer, a personal computer (PC), a tablet computer, a laptop computer, a netbook, a set-top box (STB), a personal digital assistant (PDA), an entertainment media system, a cellular telephone, a smart phone, a mobile device, a wearable device (e.g., a smart watch), a smart home device (e.g., a smart appliance), other smart devices, a web appliance, a network router, a network switch, a network bridge, or any machine capable of executing the instructions 1116, sequentially or otherwise, that specify actions to be taken by machine 1100. Further, while only a single machine 1100 is illustrated, the term "machine" shall also be taken to include a collection of machines 1100 that individually or jointly execute the instructions 1116 to perform any one or more of the methodologies discussed herein.

The machine 1100 may include processors 1110, memory 1130, and input and output (I/O) components 1150, which may be configured to communicate with each other such as via a bus 1102. In an example embodiment, the processors 1110 (e.g., a Central Processing Unit (CPU), a Reduced Instruction Set Computing (RISC) processor, a Complex Instruction Set Computing (CISC) processor, a Graphics Processing Unit (GPU), a Digital Signal Processor (DSP), an Application Specific Integrated Circuit (ASIC), a Radio-Frequency Integrated Circuit (RFIC), another processor, or any suitable combination thereof) may include, for example, processor 1112 and processor 1114 that may execute instructions 1116. The term "processor" is intended to include multi-core processor that may comprise two or more independent processors (sometimes referred to as "cores") that may execute instructions contemporaneously. Although FIG. 11 shows multiple processors 1110, the machine 1100 may include a single processor with a single core, a single processor with multiple cores (e.g., a multi-core process), multiple processors with a single core, multiple processors with multiples cores, or any combination thereof.

The memory/storage 1130 may include a memory 1132, such as a main memory, or other memory storage, and a storage unit 1136, both accessible to the processors 1110 such as via the bus 1102. The storage unit 1136 and memory 1132 store the instructions 1116 embodying any one or more of the methodologies or functions described herein. The instructions 1116 may also reside, completely or partially, within the memory 1132, within the storage unit 1136, within at least one of the processors 1110 (e.g., within the processor's cache memory), or any suitable combination thereof, during execution thereof by the machine 1100. Accordingly, the memory 1132, the storage unit 1136, and the memory of processors 1110 are examples of machine-readable media.

As used herein, "machine-readable medium" means a device able to store instructions and data temporarily or permanently and may include, but is not be limited to, random-access memory (RAM), read-only memory (ROM), buffer memory, flash memory, optical media, magnetic media, cache memory, other types of storage (e.g., Erasable Programmable Read-Only Memory (EEPROM)) and/or any suitable combination thereof. The term "machine-readable medium" should be taken to include a single medium or multiple media (e.g., a centralized or distributed database, or associated caches and servers) able to store instructions 1016. The term "machine-readable medium" shall also be taken to include any medium, or combination of multiple media, that is capable of storing instructions (e.g., instructions 1116) for execution by a machine (e.g., machine 1100), such that the instructions, when executed by one or more processors of the machine 1100 (e.g., processors 1110), cause the machine 1100 to perform any one or more of the methodologies described herein. Accordingly, a "machine-readable medium" refers to a single storage apparatus or device, as well as "cloud-based" storage systems or storage networks that include multiple storage apparatus or devices. The term "machine-readable medium" excludes signals per se.

The I/O components 1150 may include a wide variety of components to receive input, provide output, produce output, transmit information, exchange information, capture measurements, and so on. The specific I/O components 1150 that are included in a particular machine will depend on the type of machine. For example, portable machines such as mobile phones will likely include a touch input device or other such input mechanisms, while a headless server machine will likely not include such a touch input device. It will be appreciated that the I/O components 1150 may include many other components that are not shown in FIG. 11. The I/O components 1150 are grouped according to functionality merely for simplifying the following discussion and the grouping is in no way limiting. In various example embodiments, the I/O components 1150 may include output components 1152 and input components 1154. The output components 1152 may include visual components (e.g., a display such as a plasma display panel (PDP), a light emitting diode (LED) display, a liquid crystal display (LCD), a projector, or a cathode ray tube (CRT)), acoustic components (e.g., speakers), haptic components (e.g., a vibratory motor, resistance mechanisms), other signal generators, and so forth. The input components 1154 may include alphanumeric input components (e.g., a keyboard, a touch screen configured to receive alphanumeric input, a photo-optical keyboard, or other alphanumeric input components), point based input components (e.g., a mouse, a touchpad, a trackball, a joystick, a motion sensor, or other pointing instrument), tactile input components (e.g., a physical button, a touch screen that provides location and/or force of touches or touch gestures, or other tactile input components), audio input components (e.g., a microphone), and the like.

In further example embodiments, the I/O components 1150 may include biometric components 1156, motion components 1158, environmental components 1160, or position components 1162, among a wide array of other components. For example, the biometric components 1156 may include components to detect expressions (e.g., hand expressions, facial expressions, vocal expressions, body gestures, or eye tracking), measure biosignals (e.g., blood pressure, heart rate, body temperature, perspiration, or brain waves), identify a person (e.g., voice identification, retinal identification, facial identification, fingerprint identification, or electroencephalogram based identification), and the like. The motion components 1158 may include acceleration sensor components (e.g., accelerometer), gravitation sensor components, rotation sensor components (e.g., gyroscope), and so forth. The environmental components 1160 may include, for example, illumination sensor components (e.g., photometer), temperature sensor components (e.g., one or more thermometer that detect ambient temperature), humidity sensor components, pressure sensor components (e.g., barometer), acoustic sensor components (e.g., one or more microphones that detect background noise), proximity sensor components (e.g., infrared sensors that detect nearby objects), gas sensors (e.g., gas detection sensors to detection concentrations of hazardous gases for safety or to measure pollutants in the atmosphere), or other components that may provide indications, measurements, or signals corresponding to a surrounding physical environment. The position components 1162 may include location sensor components (e.g., a GPS receiver component), altitude sensor components (e.g., altimeters or barometers that detect air pressure from which altitude may be derived), orientation sensor components (e.g., magnetometers), and the like.

Communication may be implemented using a wide variety of technologies. The I/O components 1150 may include communication components 1164 operable to couple the machine 1100 to a network 1180 or devices 1170 via coupling 1182 and coupling 1172, respectively. For example, the communication components 1164 may include a network interface component or other suitable device to interface with the network 1180. In further examples, communication components 1164 may include wired communication components, wireless communication components, cellular communication components, Near Field Communication (NFC) components, Bluetooth® components (e.g., Bluetooth® Low Energy), Wi-Fi® components, and other communication components to provide communication via other modalities. The devices 1170 may be another machine or any of a wide variety of peripheral devices (e.g., a peripheral device coupled via a Universal Serial Bus (USB)).

Moreover, the communication components 1164 may detect identifiers or include components operable to detect identifiers. For example, the communication components 1164 may include Radio Frequency Identification (RFID) tag reader components, NFC smart tag detection components, optical reader components (e.g., an optical sensor to detect one-dimensional bar codes such as Universal Product Code (UPC) bar code, multi-dimensional bar codes such as Quick Response (QR) code, Aztec code, Data Matrix, Dataglyph, MaxiCode, PDF417, Ultra Code, UCC RSS-2D bar code, and other optical codes), or acoustic detection components (e.g., microphones to identify tagged audio signals). In addition, a variety of information may be derived via the communication components 1164, such as location via Internet Protocol (IP) geo-location, location via Wi-Fi® signal triangulation, location via detecting a NFC beacon signal that may indicate a particular location, and so forth.

Transmission Medium

In various example embodiments, one or more portions of the network 1180 may be an ad hoc network, an intranet, an extranet, a virtual private network (VPN), a local area network (LAN), a wireless LAN (WLAN), a wide area network (WAN), a wireless WAN (WWAN), a metropolitan area network (MAN), the Internet, a portion of the Internet, a portion of the Public Switched Telephone Network (PSTN), a plain old telephone service (POTS) network, a cellular telephone network, a wireless network, a WiFi® network, another type of network, or a combination of two or more such networks. For example, the network 1180 or a portion of the network 1180 may include a wireless or cellular network and the coupling 1182 may be a Code Division Multiple Access (CDMA) connection, a Global System for Mobile communications (GSM) connection, or other type of cellular or wireless coupling. In this example, the coupling 1182 may implement any of a variety of types of data transfer technology, such as Single Carrier Radio Transmission Technology (1×RTT), Evolution-Data Optimized (EVDO) technology, General Packet Radio Service (GPRS) technology, Enhanced Data rates for GSM Evolution (EDGE) technology, third Generation Partnership Project (3GPP) including 3G, fourth generation wireless (4G) networks, Universal Mobile Telecommunications System (UMTS), High Speed Packet Access (HSPA), Worldwide Interoperability for Microwave Access (WiMAX), Long Term Evolution (LTE) standard, others defined by various standard setting organizations, other long range protocols, or other data transfer technology.

The instructions 1116 may be transmitted or received over the network 1180 using a transmission medium via a network interface device (e.g., a network interface component included in the communication components 1164) and utilizing any one of a number of well-known transfer protocols (e.g., hypertext transfer protocol (HTTP)). Similarly, the instructions 1116 may be transmitted or received using a transmission medium via the coupling 1172 (e.g., a peer-to-peer coupling) to devices 1170. The term "transmission medium" shall be taken to include any intangible medium that is capable of storing, encoding, or carrying instructions 1116 for execution by the machine 1100, and includes digital or analog communications signals or other intangible medium to facilitate communication of such software.

Modules, Components and Logic

Certain embodiments are described herein as including logic or a number of components, modules, or mechanisms. Modules may constitute either software modules (e.g., code embodied on a machine-readable medium or in a transmission signal) or hardware modules. A hardware module is a tangible unit capable of performing certain operations and may be configured or arranged in a certain manner. In example embodiments, one or more computer systems (e.g., a standalone, client, or server computer system) or one or more hardware modules of a computer system (e.g., a processor or a group of processors) may be configured by software (e.g., an application or application portion) as a hardware module that operates to perform certain operations as described herein.

In various embodiments, a hardware module may be implemented mechanically or electronically. For example, a hardware module may comprise dedicated circuitry or logic that is permanently configured (e.g., as a special-purpose processor, such as a field-programmable gate array (FPGA) or an ASIC) to perform certain operations. A hardware module may also comprise programmable logic or circuitry (e.g., as encompassed within a general-purpose processor or other programmable processor) that is temporarily configured by software to perform certain operations. It will be appreciated that the decision to implement a hardware module mechanically, in dedicated and permanently configured circuitry, or in temporarily configured circuitry (e.g., configured by software) may be driven by cost and time considerations.

Accordingly, the term "hardware module" should be understood to encompass a tangible entity, be that an entity that is physically constructed, permanently configured (e.g., hardwired) or temporarily configured (e.g., programmed) to operate in a certain manner and/or to perform certain operations described herein. Considering embodiments in which hardware modules are temporarily configured (e.g., programmed), each of the hardware modules need not be configured or instantiated at any one instance in time. For example, where the hardware modules comprise a general-purpose processor configured using software, the general-purpose processor may be configured as respective different hardware modules at different times. Software may accordingly configure a processor, for example, to constitute a particular hardware module at one instance of time and to constitute a different hardware module at a different instance of time.

Hardware modules can provide information to, and receive information from, other hardware modules. Accordingly, the described hardware modules may be regarded as being communicatively coupled. Where multiple of such hardware modules exist contemporaneously, communications may be achieved through signal transmission (e.g., over appropriate circuits and buses that connect the hardware modules). In embodiments in which multiple hardware modules are configured or instantiated at different times, communications between such hardware modules may be achieved, for example, through the storage and retrieval of information in memory structures to which the multiple hardware modules have access. For example, one hardware module may perform an operation and store the output of that operation in a memory device to which it is communicatively coupled. A further hardware module may then, at a later time, access the memory device to retrieve and process the stored output. Hardware modules may also initiate communications with input or output devices, and can operate on a resource (e.g., a collection of information).

The various operations of example methods described herein may be performed, at least partially, by one or more processors that are temporarily configured (e.g., by software) or permanently configured to perform the relevant operations. Whether temporarily or permanently configured, such processors may constitute processor-implemented modules that operate to perform one or more operations or functions. The modules referred to herein may, in some example embodiments, comprise processor-implemented modules.

Similarly, the methods described herein may be at least partially processor-implemented. For example, at least some of the operations of a method may be performed by one or more processors or processor-implemented modules. The performance of certain of the operations may be distributed among the one or more processors, not only residing within a single machine, but deployed across a number of machines. In some example embodiments, the processor or processors may be located in a single location (e.g., within a home environment, an office environment, or a server farm), while in other embodiments the processors may be distributed across a number of locations.

The one or more processors may also operate to support performance of the relevant operations in a "cloud computing" environment or as a "software as a service" (SaaS). For example, at least some of the operations may be performed by a group of computers (as examples of machines including processors), with these operations being accessible via a network (e.g., the Internet) and via one or more appropriate interfaces (e.g., APIs).

Electronic Apparatus and System

Example embodiments may be implemented in digital electronic circuitry, or in computer hardware, firmware, or software, or in combinations of them. Example embodiments may be implemented using a computer program product, for example, a computer program tangibly embodied in an information carrier, for example, in a machine-readable medium for execution by, or to control the operation of, data processing apparatus, for example, a programmable processor, a computer, or multiple computers.

A computer program can be written in any form of programming language, including compiled or interpreted languages, and it can be deployed in any form, including as a standalone program or as a module, subroutine, or other unit suitable for use in a computing environment. A computer program can be deployed to be executed on one computer or on multiple computers at one site, or distributed across multiple sites and interconnected by a communication network.

In example embodiments, operations may be performed by one or more programmable processors executing a computer program to perform functions by operating on input data and generating output. Method operations can also be performed by, and apparatus of example embodiments may be implemented as, special purpose logic circuitry (e.g., an FPGA or an ASIC).

The computing system can include clients and servers. A client and server are generally remote from each other and typically interact through a communication network. The relationship of client and server arises by virtue of computer programs running on the respective computers and having a client-server relationship to each other. In embodiments deploying a programmable computing system, it will be appreciated that both hardware and software architectures merit consideration. Specifically, it will be appreciated that the choice of whether to implement certain functionality in permanently configured hardware (e.g., an ASIC), in temporarily configured hardware (e.g., a combination of software and a programmable processor), or in a combination of permanently and temporarily configured hardware may be a design choice. Below are set out hardware (e.g., machine) and software architectures that may be deployed, in various example embodiments.

Although the embodiments of the present invention have been described with reference to specific example embodiments, it will be evident that various modifications and changes may be made to these embodiments without departing from the broader scope of the inventive subject matter. Accordingly, the specification and drawings are to be regarded in an illustrative rather than a restrictive sense. The accompanying drawings that form a part hereof show by way of illustration, and not of limitation, specific embodiments in which the subject matter may be practiced. The embodiments illustrated are described in sufficient detail to enable those skilled in the art to practice the teachings disclosed herein. Other embodiments may be used and derived therefrom, such that structural and logical substitutions and changes may be made without departing from the scope of this disclosure. This Detailed Description, therefore, is not to be taken in a limiting sense, and the scope of various embodiments is defined only by the appended claims, along with the full range of equivalents to which such claims are entitled.

Such embodiments of the inventive subject matter may be referred to herein, individually and/or collectively, by the term "invention" merely for convenience and without intending to voluntarily limit the scope of this application to any single invention or inventive concept if more than one is in fact disclosed. Thus, although specific embodiments have been illustrated and described herein, it should be appreciated that any arrangement calculated to achieve the same purpose may be substituted for the specific embodiments shown. This disclosure is intended to cover any and all adaptations or variations of various embodiments. Combinations of the above embodiments, and other embodiments not specifically described herein, will be apparent, to those of skill in the art, upon reviewing the above description.

All publications, patents, and patent documents referred to in this document are incorporated by reference herein in their entirety, as though individually incorporated by reference. In the event of inconsistent usages between this document and those documents so incorporated by reference, the usage in the incorporated references should be considered supplementary to that of this document; for irreconcilable inconsistencies, the usage in this document controls.

In this document, the terms "a" or "an" are used, as is common in patent documents, to include one or more than one, independent of any other instances or usages of "at least one" or "one or more." In this document, the term "or" is used to refer to a nonexclusive or, such that "A or B" includes "A but not B," "B but not A," and "A and B," unless otherwise indicated. In the appended claims, the terms "including" and "in which" are used as the plain-English equivalents of the respective terms "comprising" and "wherein." Also, in the following claims, the terms "including" and "comprising" are open-ended; that is, a system, device, article, or process that includes elements in addition to those listed after such a term in a claim are still deemed to fall within the scope of that claim.

What is claimed is:

1. A system comprising:
one or more processors; and
a non-transitory memory storing instructions that, when executed by the one or more processors, cause the system to perform operations comprising:
receiving, from a first client device, a query that includes a request for identification of an item and a reward value associated with the query, the request including an audio input, image data, or both;
transmitting the query that includes the audio input, the image data, or both to a plurality of user devices;
receiving a plurality of description suggestions based on the audio input, the image data, or both from the plurality of user devices in response to transmitting the query;
receiving, from the first client device, an indication of a selected description suggestion from the plurality of description suggestions;
training an artificial intelligence (AI) module to identify the item based on the selected description suggestion;
accessing, by the system, a financial account associated with a user associated with the first client device where the system is associated a third party separate from the user associated with the first client device;
retrieving, by the system, a reward corresponding to the reward value from the financial account; and
delivering, by the system, the reward to a user account associated with a first user device of the one or more user devices that provided the selected description suggestion.

2. The system of claim 1, wherein the instructions are further executable by the one or more processors to cause the system to perform operations comprising notifying the first client device that the plurality of description suggestions from the one or more user devices were received, wherein receiving the indication of the selected description suggestion is based at least in part on the notifying.

3. The system of claim 1, wherein the instructions are further executable by the one or more processors to cause the system to perform operations comprising
causing the first client device to display the plurality of description suggestions from the one or more user devices responsive to the query, wherein receiving the indication of the selected description suggestion from the plurality of description suggestions is based on causing the first client device to display the plurality of description suggestions.

4. The system of claim 1, wherein the instructions executable to cause the system to receive the indication of the selected description suggestion from the plurality of description suggestions are further executable by the one or more processors to cause the system to perform operations comprising receiving an indication of a best description suggestion from the plurality of description suggestions, wherein the selected description suggestion comprises the best description suggestion.

5. The system of claim 1, wherein the instructions are further executable by the one or more processors to cause the system to perform operations comprising receiving, from the first client device, an indication of whether each description suggestion of the plurality of description suggestions is wrong or correct.

6. The system of claim 5, wherein the instructions are further executable by the one or more processors to cause the system to perform operations comprising delivering the reward to each user account associated with a respective user device of the plurality user devices that provided a description suggestion of the plurality of description suggestions indicated as correct.

7. The system of claim 1, wherein the query includes a category of the item, and wherein receiving the plurality of description suggestions from the plurality user devices responsive to the query is based on the category of the item.

8. The system of claim 1, wherein the query includes an image of the item and wherein receiving the plurality of description suggestions from the plurality user devices responsive to the query is based on the image of the item.

9. A computer-implemented method, comprising:
receiving, by at least one processor, from a first client device, a query that includes a request for identification of an item and a reward value associated with the query, the request including an audio input, image data, or both;
transmitting the query that includes the audio input, the image data, or both to a plurality of user devices;
receiving a plurality of description suggestions based on the audio input, the image data, or both from the plurality of user devices in response to transmitting the query;
receiving, from the first client device, an indication of a selected description suggestion from the plurality of description suggestions;
training an artificial intelligence (AI) module to identify the item based on the selected description suggestion;
accessing, by a system, a financial account associated with a user associated with the first client device where the system is associated a third party separate from the user associated with the first client device;
retrieving, by the system, a reward corresponding to the reward value from the financial account; and
delivering, by the system, the reward to a user account associated with a first user device of the plurality of user devices that provided the selected description suggestion.

10. The computer-implemented method of claim 9, further comprising notifying the first client device that the plurality of description suggestions from the plurality user devices were received, wherein receiving the indication of the selected description suggestion is based at least in part on the notifying.

11. The computer-implemented method of claim 9, further comprising causing the first client device to display the plurality of description suggestions from the plurality user devices responsive to the query, wherein receiving the indication of the selected description suggestion from the plurality of description suggestions is based on causing the first client device to display the plurality of description suggestions.

12. The computer-implemented method of claim 9, wherein receiving the indication of the selected description suggestion from the plurality of description suggestions comprises receiving an indication of a best description suggestion from the plurality of description suggestions, wherein the selected description suggestion comprises the best description suggestion.

13. The computer-implemented method of claim 9, further comprising receiving, from the first client device, an indication of whether each description suggestion of the plurality of description suggestions is wrong or correct.

14. The computer-implemented method of claim 9, further comprising delivering the reward to each user account associated with a respective user device of the plurality user devices that provided a description suggestion of the plurality of description suggestions indicated as correct.

15. The computer-implemented method of claim 9, wherein the query includes a category of the item, and wherein receiving the plurality of description suggestions from the plurality user devices responsive to the query is based on the category of the item.

16. The computer-implemented method of claim 9, wherein the query includes an image of the item and wherein receiving the plurality of description suggestions from the plurality user devices responsive to the query is based on the image of the item.

17. A non-transitory machine-readable storage medium comprising processor executable instructions that, when executed by a processor of a machine, cause the machine to perform operations comprising:

receiving, by at least one processor, from a first client device, a query that includes a request for identification of an item and a reward value associated with the query, the request including an audio input, image data, or both;

transmitting the query that includes the audio input, the image data, or both to a plurality of user devices;

receiving a plurality of description suggestions based on the audio input, the image data, or both from the plurality of user devices in response to transmitting the query;

receiving, from the first client device, an indication of a selected description suggestion from the plurality of description suggestions;

training an artificial intelligence (AI) module to identify the item based on the selected description suggestion;

accessing, by a system, a financial account associated with a user associated with the first client device where the system is associated a third party separate from the user associated with the first client device;

retrieving, by the system, a reward corresponding to the reward value from the financial account; and delivering, by the system, the reward to a user account associated with a first user device of the plurality of user devices that provided the selected description suggestion.

18. The non-transitory machine-readable storage medium of claim 17, wherein the instructions, when executed, cause the machine to perform operations comprising notifying the first client device that the plurality of description suggestions from the plurality user devices were received, wherein receiving the indication of the selected description suggestion is based at least in part on the notifying.

* * * * *